United States Patent [19]
Dickinson

[11] 3,749,248
[45] July 31, 1973

[54] FILL PASSAGE OIL STRAINER

[75] Inventor: Bryan J. Dickinson, Zenith, Wash.

[73] Assignee: FMC Corporation, San Jose, Calif.

[22] Filed: June 2, 1971

[21] Appl. No.: 149,311

[52] U.S. Cl.................... 210/238, 91/498, 210/436, 210/472
[51] Int. Cl....................... I01m 11/00, B01d 35/02
[58] Field of Search.................... 210/153, 162, 167, 210/168, 172, 238, 472; 91/498

[56] References Cited
UNITED STATES PATENTS

| | | | |
|---|---|---|---|
| 1,846,072 | 2/1932 | Whyte.............................. | 210/168 X |
| 3,306,171 | 2/1967 | Gordon................................ | 91/498 |
| 1,746,121 | 2/1930 | Levy................................. | 210/237 |
| 1,155,070 | 9/1915 | Kessler......................... | 210/172 UX |
| 2,010,445 | 8/1935 | Sparks............................. | 210/172 X |
| 2,492,831 | 12/1949 | Banker......................... | 210/168 UX |
| 2,447,144 | 8/1948 | Thornton........................ | 210/108 X |

Primary Examiner—Samih N. Zaharna
Assistant Examiner—T. A. Granger
Attorney—F. W. Anderson and C. E. Tripp

[57] ABSTRACT

An oil strainer for insertion into the oil fill passage of a motor housing and projecting beyond the passage to provide a straining surface substantially greater than the diametrical area of the oil fill passage. The strainer incorporates an end cap having a stem receivable in a cavity of the motor housing to maintain the strainer in axial alingment with the oil fill passage and to prevent the strainer from being inadvertently pushed out of the fill passage. A handle is provided for easy removal.

2 Claims, 3 Drawing Figures

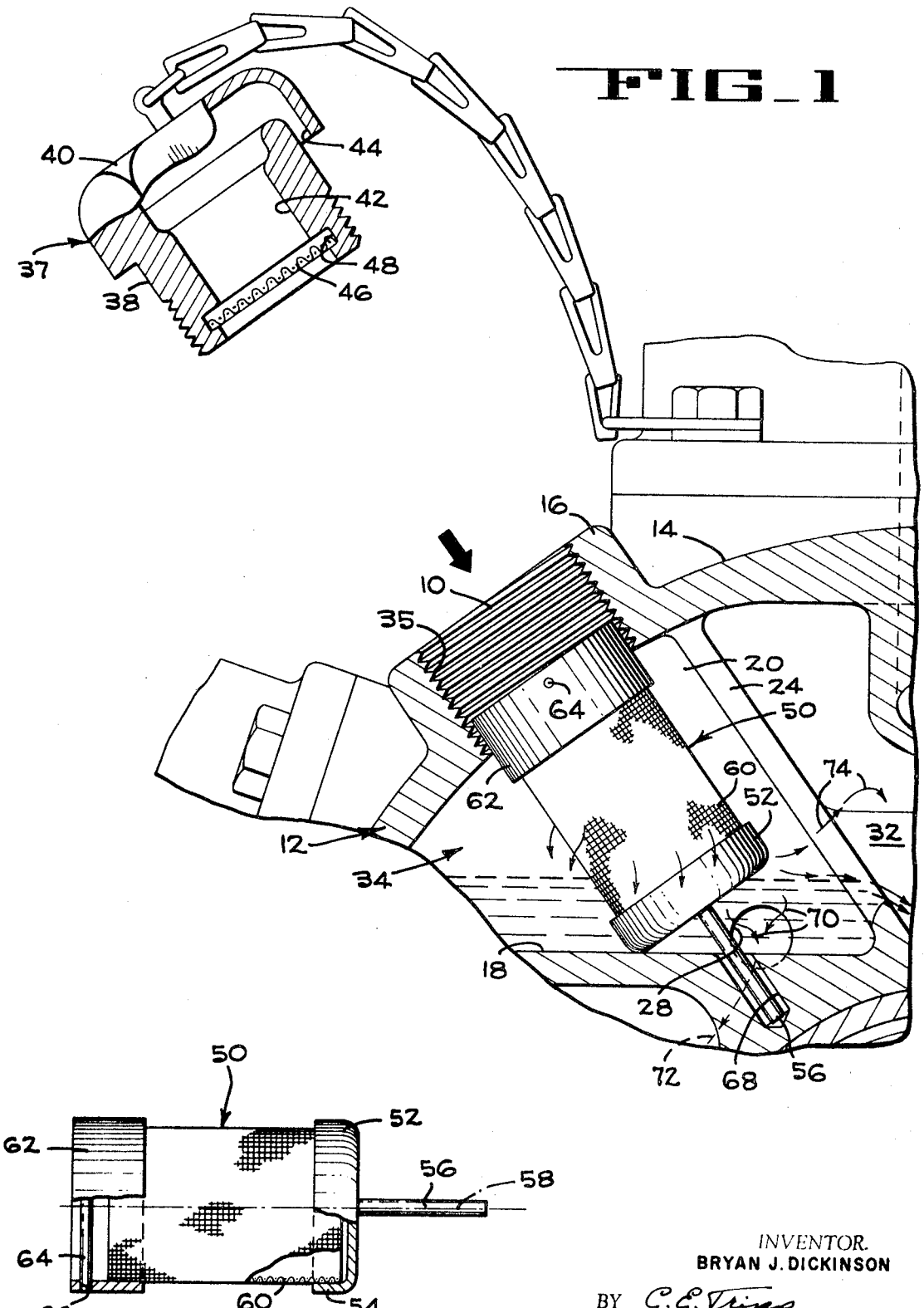

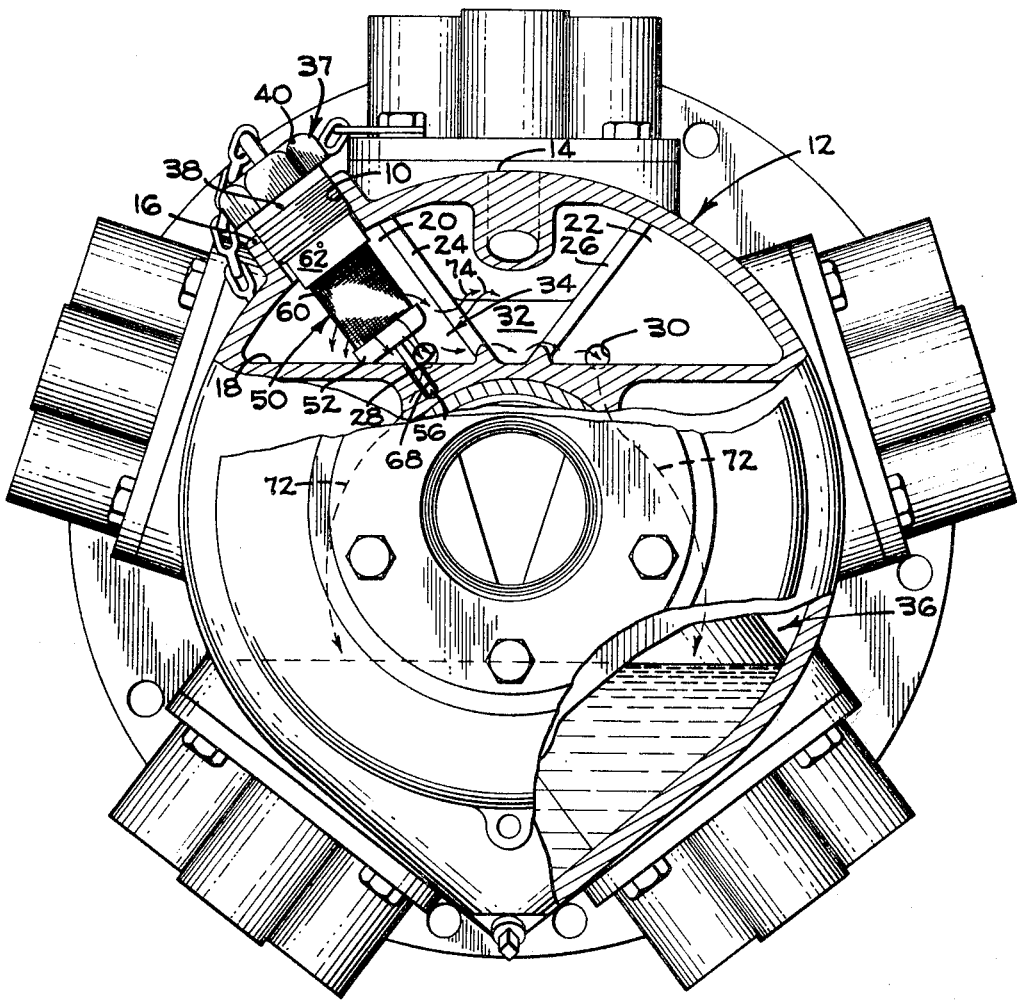
FIG_3

FILL PASSAGE OIL STRAINER

BACKGROUND OF THE INVENTION

1. Field of the Invention

The present invention relates to a strainer element for an oil fill passage of an air motor and more particularly to a strainer element that permits servicing of an air motor under adverse environmental operating conditions.

2. Description of the Prior Art

Many compressed air motors in the mining and construction industries are employed in an extremely dirty environmental location. For example, workmen in underground mines, when refilling the oil in an air motor crankcase, may find that the entire motor is virtually buried under crushed rock and mud. They are supposed to carefully clean away all foreign matter in the vicinity of the filler cap prior to its removal. This is rarely accomplished in a careful manner; and upon removal of the filler cap, dirt, rock, and other foreign materials cascade or slide into the open filler hole. Additionally, the normally oily oil can spouts become coated with dirt and the workmen quite often fail to clean the spout prior to pouring oil into the motor, resulting in discharge of foreign matter in the motor.

Some manufacturers of air motors provide a simple screen extending across the diameter of the oil fill passage to prevent the entry of foreign material. This solution has several shortcomings. Due to the viscosity of the oil, especially when cold, and the relatively fine screen mesh that must be employed to keep out foreign material, these screens do not provide enough effective screen area to pass the oil at a reasonable rate of speed. Furthermore, these small screens are quickly clogged with foreign matter and are generally difficult to remove and clean. Another disadvantage of such screens is that they are easily punctured by an oil can spout or may be pushed out of the housing where they may fall into a position where removal of the filter is difficult or where the filter will interfer with the operation of the motor.

SUMMARY OF THE INVENTION

The present invention solves the problem of preventing foreign matter from entering the crankcase of an air motor during oil filling operations without the inherent problems existing in present screening devices. A rapid oil fill rate is achieved by employing a cylindrical or bucket type strainer element, extending into the motor housing, having a substantially greater effective screening area than the diametrical area of the oil fill passage.

Another feature of the invention is the provision of means which permits an operator to reach into the oil fill passage and grasp the strainer for simple removal.

An additional feature of the invention is the provision of means to retain the strainer element in axial alignment with the oil fill passage to prevent the element from cocking or binding in the fill passage due to motor vibration or during element removal. Means is also provided to prevent the strainer element from being inadvertently pushed into the motor housing if an oil can fill spout is carelessly forced into the oil fill passage.

Yet another advantage of the invention is the provision of a sufficiently rigid strainer element construction that, after removal from the motor housing, permits removal of foreign matter by tapping the element against a hard object.

These and other features and advantages will become apparent upon consideration of the following drawings and description of the invention.

DESCRIPTION OF THE DRAWINGS

FIG. 1 is a partial end view of a typical air motor housing, having portions broken away to show the oil fill passage and strainer element.

FIG. 2 is a side view of the strainer element, having portions broken away.

FIG. 3 is an end view of the air motor having portions broken away showing the path of oil flow from the strainer into the crankcase.

DESCRIPTION OF THE INVENTION

Air motors of the type presently in use and well known in the art, are described by Gordon in U.S. Pat. No. 3,306,171, issued Feb. 28, 1967. The air motor disclosed herein has an oil fill passage 10 located on an upper front portion of a motor housing 12 as shown in FIGS. 1 and 3. The housing 12 comprises an outer wall 14 having a raised boss 16 and multiple inner walls such as shown at 18, 20 and 22.

The vertical walls 20 and 22 are integral with the horizontal wall 18 and are stiffened by webs 24 and 26. Webs 24 and 26 are interconnected with an additional web 32. These walls and webs partially define chamber 34 which is in communication with the interior of the air motor housing through oil holes 28 and 30. The interior of the housing includes a crankcase portion 36 to which the lubricating oil gravitates.

The oil fill passage 10 is centrally bored in the boss 16 and may be threaded as indicated at 35 to receive a breather cap 37 for closing the oil fill passage. The breather cap comprises a body portion 38, externally threaded at it's lower end, and an integral cap portion 40. A breather passage 42 extends through the body portion 38 and exits through a segmental annular opening between the body and cap portions as indicated at 44. To prevent passage of debris through the breather passage 42, a fine mesh wire screen 46 is retained in an annular groove 48 in the passage 42. A strainer element 50 is shown in the inserted position, partially within the oil fill passage 10 and extending into the chamber 34.

Referring now to FIG. 2, the strainer element 50 comprises a cup shaped end cap 52 having an upwardly extending circular flange 54. A stem 56 is rigidly attached to the base of the end cap 52 in axial alignment with the central axis of the strainer element indicated at 58. A cylindrical wire screen 60 of the desired mesh having a surface area substantially greater than the diametrical area of the oil fill passage 10 is inserted into the end cap 52 and is attached to the upwardly extending circular flange 54 by soldering or other suitable method.

A rigid tubular collar 62 is fitted over the other end of the screen 60 and is attached thereto in a manner similar to the attachment of the end cap 52, leaving one end of the strainer open. In order to provide a handle to facilitate the insertion and removal of the strainer from the oil fill passage 10, a bar 64 is inserted into diametrically opposed holes 66 (only one being shown in FIG. 2) in the collar 62 and secured therein.

The collar 62 has a diameter such that it forms a close fit with the interior of the oil fill passage 10, or with the threads 35 thereof, as shown in FIG. 1, preventing passage of foreign material between the collar 62 and threads 35 while permitting insertion and removal of the strainer.

The strainer is inserted through the oil fill passage 10 and extends into the chamber 34. The stem 56 on the strainer projects into a drilled hole 68 in the housing wall member 18. This hole is in axial alignment with the oil fill passage 10 and, in cooperation with the stem 56, prevents the strainer from cocking or binding in the passage 10. The strainer 50 is axially retained, so that at least a portion of the strainer remains in the oil passage 10, by the abutment of the end cap 52 against wall 18. It will be apparent that this axial positioning may also be accomplished by the stem 56 bottoming in the hole 68.

The strainer 50 is easily removed by reaching in through the oil fill passage 10, grasping the bar 64 and withdrawing the strainer. After the strainer has been removed it may be cleaned in the normal manner; however, due to the rigid construction of the strainer, emergency cleaning may be accomplished by tapping the rigid collar 62 against an object to dislodge debris trapped therein. The stem 56 serves as a convenient handle for this purpose.

When oil is poured into the oil passage 10, it passes through the strainer 50 into the cavity 34. The oil flows out of the cavity 34 through oil holes 28 and 30 as indicated by arrows 70 in FIG. 1. As schematically indicated by dashed lines 72 in FIG. 3, the oil passing through hole 28 and 30 drains into the crankcase portion 36 of the motor housing 12. If the level of the oil in cavity 34 rises sufficiently high during rapid filling, it may also flow over web 32 into the crankcase 36 as indicated by arrows 74.

Although the best mode contemplated for carrying out the present invention has been herein shown and described, it will be apparent that modification and variation may be made without departing from what is regarded to be the subject matter of the invention.

I claim:

1. In an air motor having a housing with an oil fill passage therein, the combination therewith of:
   a. closure means for said oil passage,
   b. a removable strainer insertable into said oil passage,
      1. said strainer having one open end for receiving fluid to be strained,
      2. said open end projecting at least partially into said oil fill passage in a close fitting relationship therewith,
      3. rigid collar means on said open ended strainer portion,
      4. a handle on said strainer positioned to be easily grasped through said oil fill passage,
      5. an end cap enclosing the other end of said strainer,
      6. a stem on the end cap in axial alignment with said strainer,
   c. an abutment surface in the housing for engaging said strainer end cap to limit the axial movement of said strainer in one direction to maintain said collar means in the oil fill passage, and
   d. a cavity in said housing in axial alignment with the oil fill passage for receiving the stem.

2. An apparatus according to claim 1 wherein said closure means includes means defining a vent to the atmosphere, and additionally comprising a screen in said closure means disposed between said vent and said oil passage to screen impurities from the air entering said oil passage.

* * * * *